(12) United States Patent
Lanzani et al.

(10) Patent No.: US 12,379,273 B2
(45) Date of Patent: Aug. 5, 2025

(54) FASTENER, READER, KIT, AND SIGNAL ACQUIRING METHOD

(71) Applicants: SENS-IN S.R.L., San Lazzaro di Savena (IT); ISANIK S.R.L., Azzano Mella (IT)

(72) Inventors: Federico Lanzani, Azzano Mella (IT); Michele Poggipolini, San Lazzaro di Savena (IT)

(73) Assignee: SENS-IN S.R.L., Lazzaro di Savena (IT)

( * ) Notice: Subject to any disclaimer, the term of this patent is extended or adjusted under 35 U.S.C. 154(b) by 410 days.

(21) Appl. No.: 17/774,730

(22) PCT Filed: Nov. 6, 2020

(86) PCT No.: PCT/IB2020/060476
§ 371 (c)(1),
(2) Date: May 5, 2022

(87) PCT Pub. No.: WO2021/090265
PCT Pub. Date: May 14, 2021

(65) Prior Publication Data
US 2022/0397473 A1 Dec. 15, 2022

(30) Foreign Application Priority Data
Nov. 8, 2019 (IT) .................. 102019000020656

(51) Int. Cl.
*G01L 5/24* (2006.01)
*F16B 31/02* (2006.01)

(52) U.S. Cl.
CPC ............... *G01L 5/24* (2013.01); *F16B 31/02* (2013.01)

(58) Field of Classification Search
CPC .......... G01L 5/24; F16B 31/02; F16B 31/025
USPC ........................................................ 702/41
See application file for complete search history.

(56) References Cited

U.S. PATENT DOCUMENTS

| | | | |
|---|---|---|---|
| 9,894,767 B1 * | 2/2018 | Krugman | H05K 1/144 |
| 10,055,623 B2 | 8/2018 | Chu | |
| 2003/0124895 A1 * | 7/2003 | Winter | H01R 13/2421 |
| | | | 439/219 |
| 2008/0253858 A1 * | 10/2008 | Hsieh | F16B 31/02 |
| | | | 411/14 |
| 2009/0210173 A1 * | 8/2009 | Arms | G01L 5/24 |
| | | | 702/42 |

(Continued)

FOREIGN PATENT DOCUMENTS

| | | |
|---|---|---|
| DE | 202007007219 U1 | 7/2007 |
| WO | WO 2016193887 A1 | 8/2016 |

OTHER PUBLICATIONS

PCT International Search Report and Written Opinion dated Feb. 25, 2020 for PCT Application No. PCT/IB2020/059821.

*Primary Examiner* — John H Le
(74) *Attorney, Agent, or Firm* — McCarter & English, LLP

(57) ABSTRACT

A signal acquiring method is provided using a plurality of fasteners with sensing elements configured to generate electrical signals as a function of the operating conditions of a plurality of readers, and an acquiring system. The method involves generating one or more electrical signals by means of the sensing elements, mechanically connecting the readers to the fasteners, and transferring the signals to the acquiring system by means of the readers.

19 Claims, 9 Drawing Sheets

(56) References Cited

U.S. PATENT DOCUMENTS

| | | |
|---|---|---|
| 2011/0043371 A1 | 2/2011 | German et al. |
| 2014/0260652 A1* | 9/2014 | Hsieh ........................ G01L 5/24 |
| | | 73/761 |
| 2015/0041162 A1 | 2/2015 | Chu et al. |
| 2015/0247520 A1* | 9/2015 | Hsieh ........................ G01L 5/24 |
| | | 411/14 |
| 2018/0012047 A1* | 1/2018 | Chu ................... G06K 7/10366 |
| 2018/0231047 A1* | 8/2018 | Tran ..................... F16B 31/025 |
| 2018/0252255 A1* | 9/2018 | Fondriest .............. F16B 31/025 |
| 2020/0339274 A1* | 10/2020 | Callahan ................. B60R 11/04 |

* cited by examiner

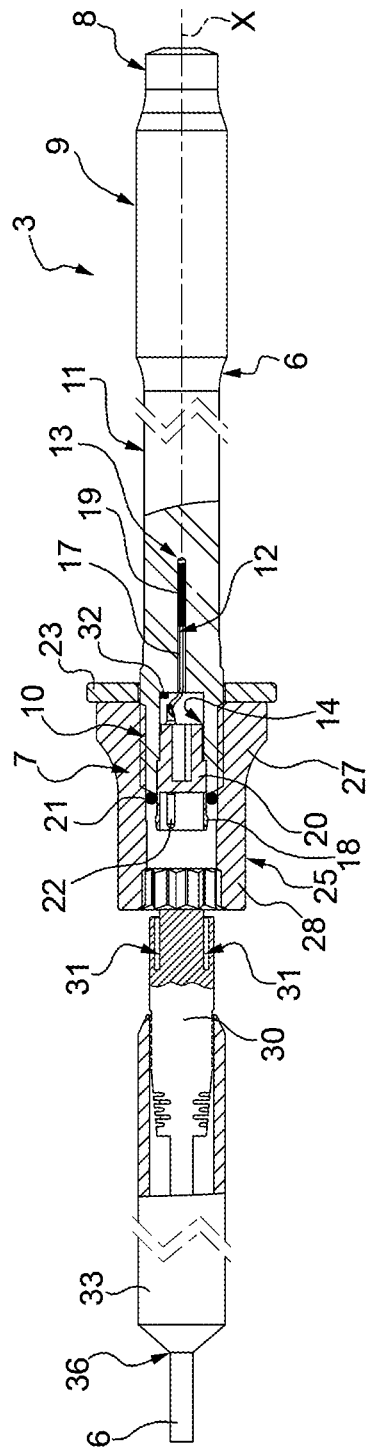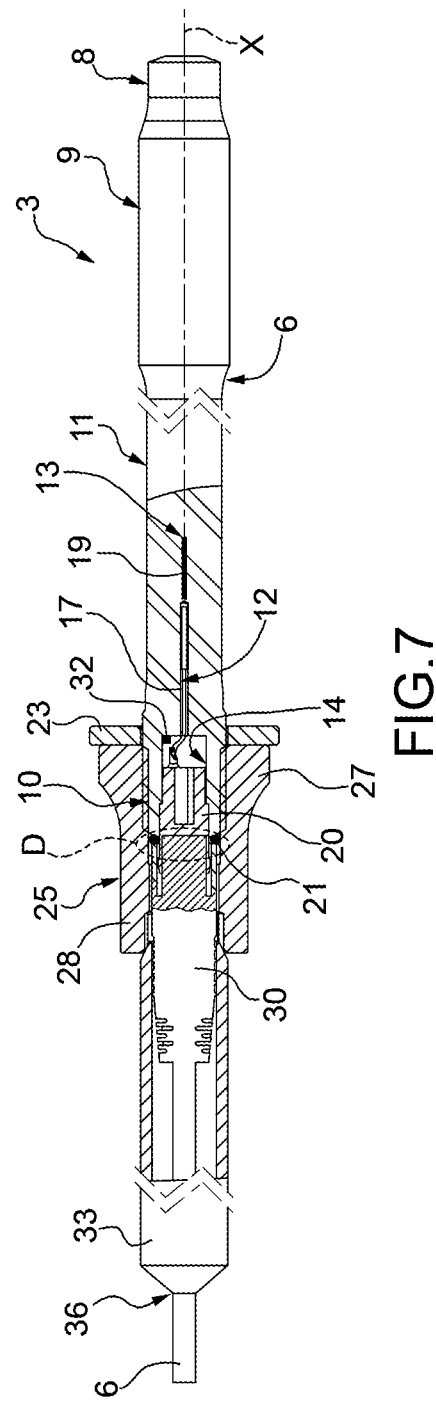
FIG.6
FIG.7

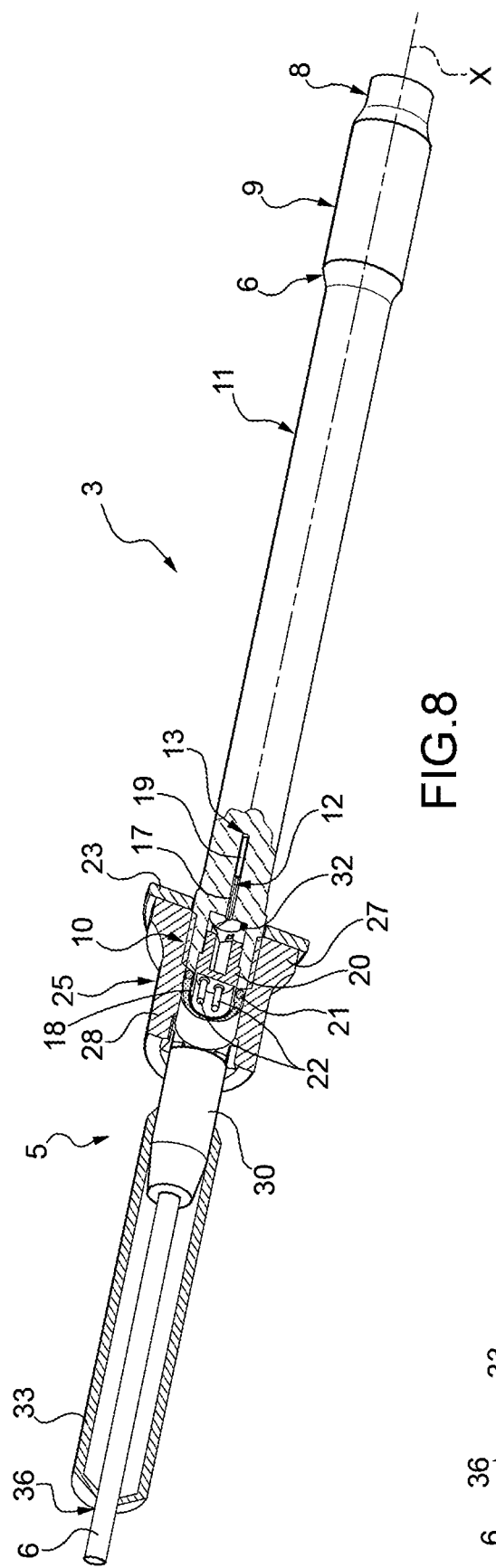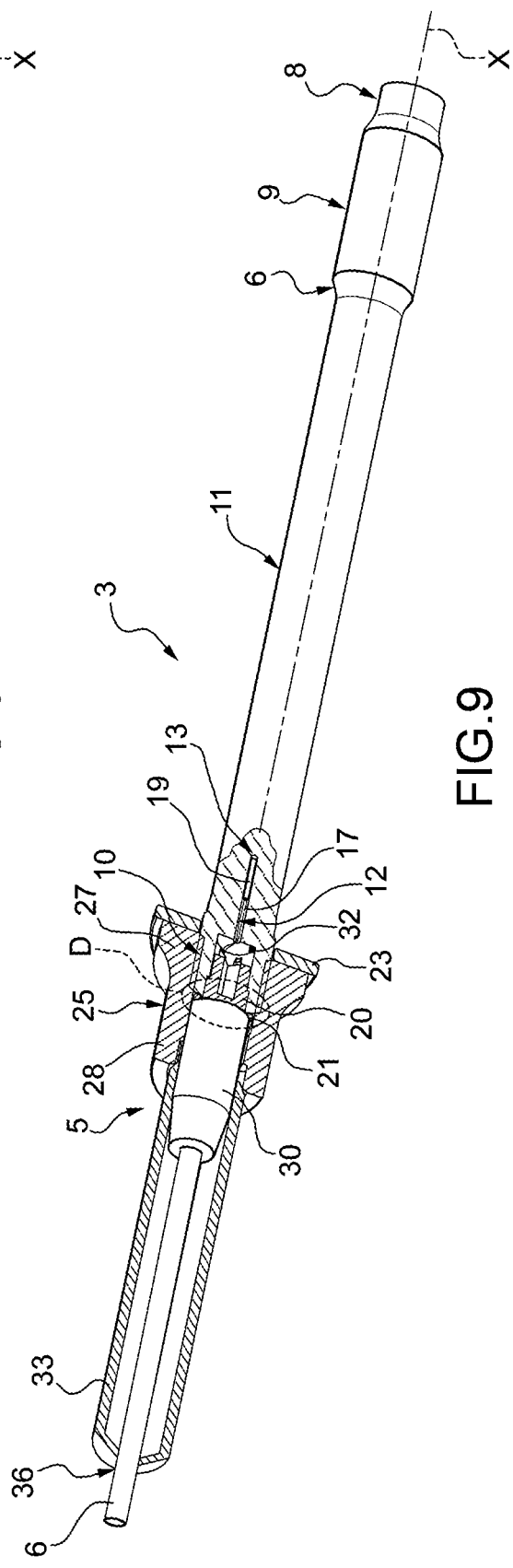

FASTENER, READER, KIT, AND SIGNAL ACQUIRING METHOD

CROSS-REFERENCE TO RELATED APPLICATIONS

This patent application is a 35 U.S.C. § 371 National Stage filing of International Application No. PCT/IB2020/060476, filed on Nov. 6, 2020, which application claims priority from Italian patent application no. 102019000020656 filed on Nov. 8, 2019, the entire disclosures of which are is incorporated herein by reference.

TECHNICAL FIELD

This patent application for an invention relates to a fastener, a reader, a kit, and a signal acquiring method.

In particular, this invention relates to a fastener, in particular a screw, that comprises sensors and is configured to interact with a reader, so as to ensure not only its function of fastening components of a mechanical apparatus but also its function of generating electrical signals according to the immediate operating conditions of the fastener and/or the physical phenomena passing through the fastener and its function of transferring these electrical signals outside the fastener itself.

BACKGROUND ART

The use of fasteners is known, in particular screws, for connecting two or more components of a mechanical apparatus together. During use, the fasteners, in particular the screws, are subjected to elevated mechanical stress and they must have elevated mechanical resistance (and often thermal resistance, too) so as to ensure the correct operation, over time, of the mechanical apparatus, in which they are applied.

The fasteners, in particular the screws, are applied in a great number of mechanical apparatuses.

Fasteners, particularly screws, are often installed in positions that are subject to high vibrations, For example, at the cylinder head of a combustion engine, or on aeronautical and aerospace vehicles.

In general, a fastener comprises a shank that is the connecting/holding element; depending on the type of clamping element, the shank may have a head or may cooperate with other components such as: nuts, washers, rings, or the like. The fastener is preferably configured to tighten bodies, which are subjected to elevated dynamic stress, i.e. vibrations, and/or thermal stress.

One example of a fastener is the stud or the tension screw, which comprises, in addition to the shank, a head, projecting both axially and radially outwards from the shank.

Special fasteners are also known, such as special studs or tension screws, i.e. made of a high performance material, which is lighter than steel (generally for automotive or aerospace applications)

This invention preferably relates to tightening elements, in particular screws, made of a material with elevated mechanical and thermal resistance, for example, made of titanium alloy. In particular, this invention refers to fasteners made of titanium or titanium alloys.

The installation of sensors on the fasteners is also known, but these sensors must be electrically powered. In addition, fasteners of a known type with sensors are used for bench tests or during tests, i.e. in conditions where an operator is able to directly access the fastener.

The use of a sensor adapter, as in U.S. Pat. No. 10,055,623 B2, placed between the fastener and a tightening tool is also known, in order to detect the tightening torque applied during the tightening operation. This known type of sensor adapter comprises a plurality of sensors inside to detect the tightening torque; in addition, it must be able to transmit the tightening torque from the tool to the fastener without being damaged or deformed. Disadvantageously, then, this known type of sensor adapter is particularly bulky, as well as heavy, since it must be made of metal in order to ensure adequate resistance and torque transmission during tightening. In addition, this known type of sensor adapter only enables tightening torque detection when tightening the specific, individual fastener.

Advantageously, this application for an invention relates to a method for acquiring signals by means of a plurality of fasteners, in particular studs, and a plurality of readers for the immediate detection of the axial force of each fastener of a mechanical apparatus, so as to define the best tightening strategy based on a control unit's re-processing of the acquired signals.

In addition, this application for an invention relates to a fastener provided with sensors, a reader, and an acquiring system that are configured to acquire and exchange electrical signals with each other and, advantageously, even during normal use of fasteners installed on board a mechanical apparatus.

It is well known that, for the correct implementation of the bolted joints of a mechanical apparatus, it is of primary importance to determine the correct tightening torque in order to transfer a desired and pre-set axial force to the joint. Generally, the tightening torque is theoretically defined, but in practice there may be physical and mechanical phenomena that interfere with the theoretical values.

Determining the correct tightening torque is particularly important when designing a new mechanical apparatus (such as an engine or rotor of an aircraft, such as a helicopter, or the like). For example, known acquiring systems comprise studs equipped with strain gauges for testing engines or conventional screws equipped with strain gauges for testing other mechanical apparatuses such as aircraft rotors or the like.

Strain gauges are usually attached externally to the body of the screws. The external application of strain gauges also involves, of course, the application of wiring.

Therefore, known acquiring systems have the disadvantage of having to intervene in the configuration of the mechanical apparatus with processing/adaptations, in order to enlarge the passage seats to allow the housing of both the screws and wiring. In addition, there is a high risk of severing the wiring when mounting the screws.

Obviously, the greater the number of joining zones using screws of a mechanical apparatus, the greater the number of screws involved and, consequently, of wires that risk being severed. Therefore, when applied to complex mechanical apparatuses, such as aircraft rotors or engine applications, the known systems have a high probability of failure.

In cases where it is necessary to ensure a high level of safety for a mechanical apparatus, for example a motor vehicle or aircraft, it is known to check and record the pulling force applied to each screw. In addition, for these types of applications, it is necessary to enable the traceability of the screw, for example to change the screw, if necessary, at prescribed maintenance intervals or to reconstruct the history of all the interventions made.

In addition, during the development of a tightening protocol for complex mechanical apparatuses, which involve the application of a plurality of fasteners, it is necessary to be able to determine the load variations on the individual fasteners already tightened as additional fasteners are tightened onto the component itself. The purpose of this invention is to provide a kit and a method for simplifying this acquisition process. In particular, the purpose of this invention is to provide a method and an acquiring kit that can be used for continuously collecting signals, including during the tightening of one or more fasteners.

DISCLOSURE OF INVENTION

Advantageously, the purpose of this invention is also to provide a method and a kit for acquiring signals that can communicate with a remote acquiring system wirelessly, i.e. without a cable connection.

The purpose of this invention is to provide a fastener, in particular a screw, which overcomes the above-mentioned drawbacks, in particular it can be installed in pre-existing holes, without the need for additional machining.

The purpose of this invention is to provide an acquiring kit, which enables the continuous detection of a plurality of signals generated by the tightening of a plurality of fasteners and is configured to exchange these signals with an acquiring system to collect and/or reprocess them in order to determine the correct axial force exerted by each fastener or the correct tightening protocol of a mechanical apparatus.

According to this invention, a method as recited in the appended claims is provided.

According to this invention, a fastener, in particular a screw, as recited in the appended claims is provided.

According to this invention, a reader as recited in the appended claims is provided.

According to this invention, an acquiring kit as recited in the appended claims is provided.

BRIEF DESCRIPTION OF THE DRAWINGS

The invention will now be described with reference to the appended drawings, which illustrate a non-limiting embodiment thereof, wherein:

FIGS. 6 to 9 illustrate, in cross-section, the detail in FIG. 5 in different operating configurations;

BEST MODE FOR CARRYING OUT THE INVENTION

Figure 1:
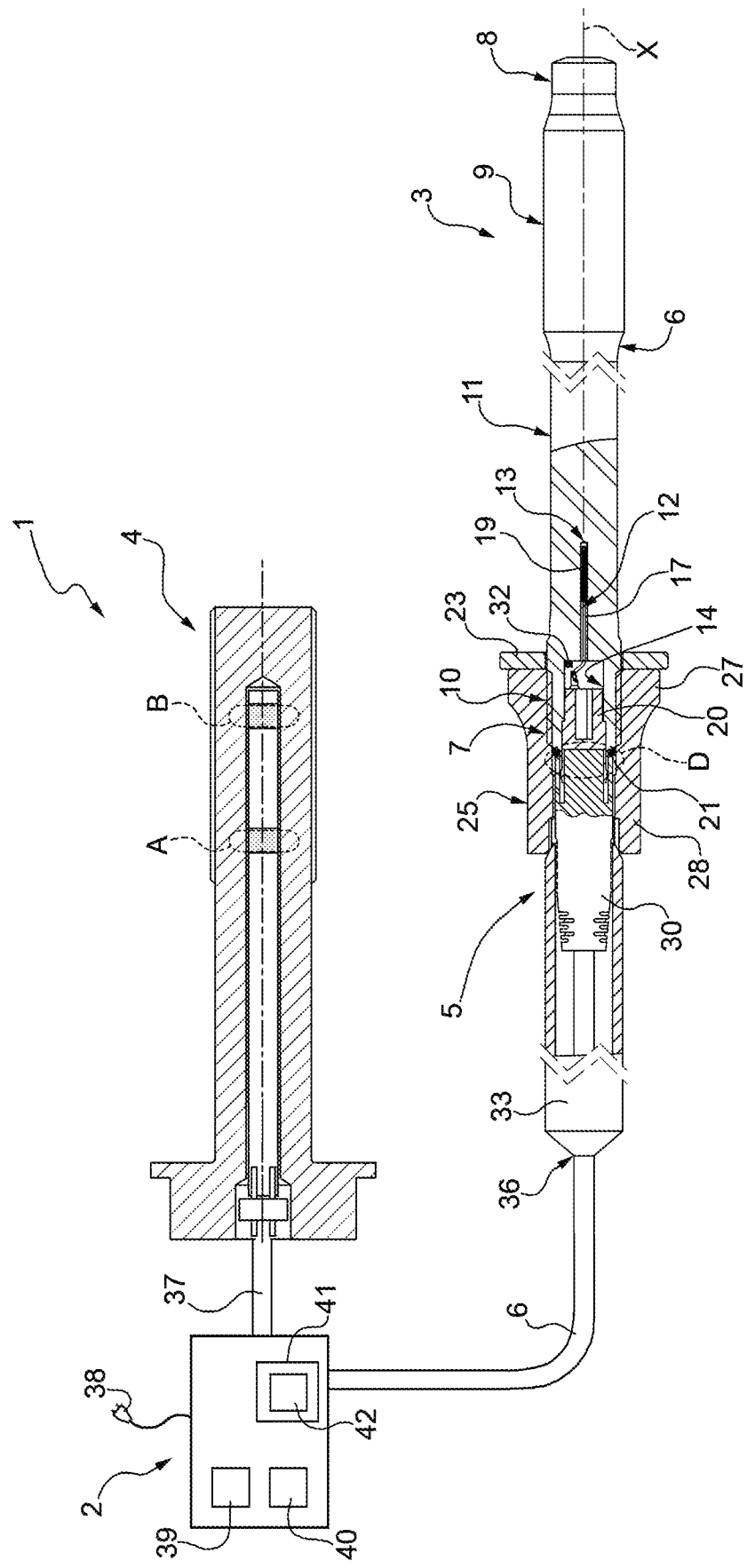
FIG. 1 schematically, and partially in cross-section, illustrates the acquiring kit according to this invention.

In FIG. 1, the number 1 identifies, as a whole, an acquiring kit according to this invention.

The acquiring kit 1 comprises at least one acquiring system 2, a fastener 3, 4, and a reader 30.

In this discussion, "fastener" means an element configured to connect two or more mechanical components together. A fastener is configured to be subjected to high mechanical stresses during use. A fastener may comprise a shank that is the connecting/holding element; depending on the type of tightening element, the shank may have a head or may cooperate with other components such as: nuts, washers, rings, or the like.

The fastener is preferably configured to tighten bodies that are subjected to elevated dynamic stress, i.e. vibrations, and/or thermal stress. The following can be considered as fasteners: rivets, screws, tie-rods, or the like.

Advantageously, according to this invention, a fastener is a screw with at least a partially threaded shank.

According to the example illustrated in FIGS. 1 to 9, the kit 1 comprises studs 3 provided with sensors as fasteners, each of which exchanges signals with the acquiring system 2. Advantageously, the kit 1 can also comprise one or more screws 4 provided with sensors, which exchange signals with the acquiring system 2 as will be better illustrated below.

The acquiring kit 1 preferably comprises a connection unit 5 and a cable 6 for connecting the connection unit 5 to the acquiring system 2. The connection unit 5 is configured to connect and exchange signals between a respective stud 3 and the acquiring system 2, as will be further illustrated below.

Advantageously, the kit 1 is configured to precisely determine the torque to be applied (in a known way) and to a given stud 3 in order to achieve the desired axial force.

In particular, the kit 1 finds advantageous application in determining exactly the torques to be applied to screws applied to a mechanical apparatus, in particular a complex mechanical apparatus such as, for example, a car engine or an aircraft rotor.

Figure 2:
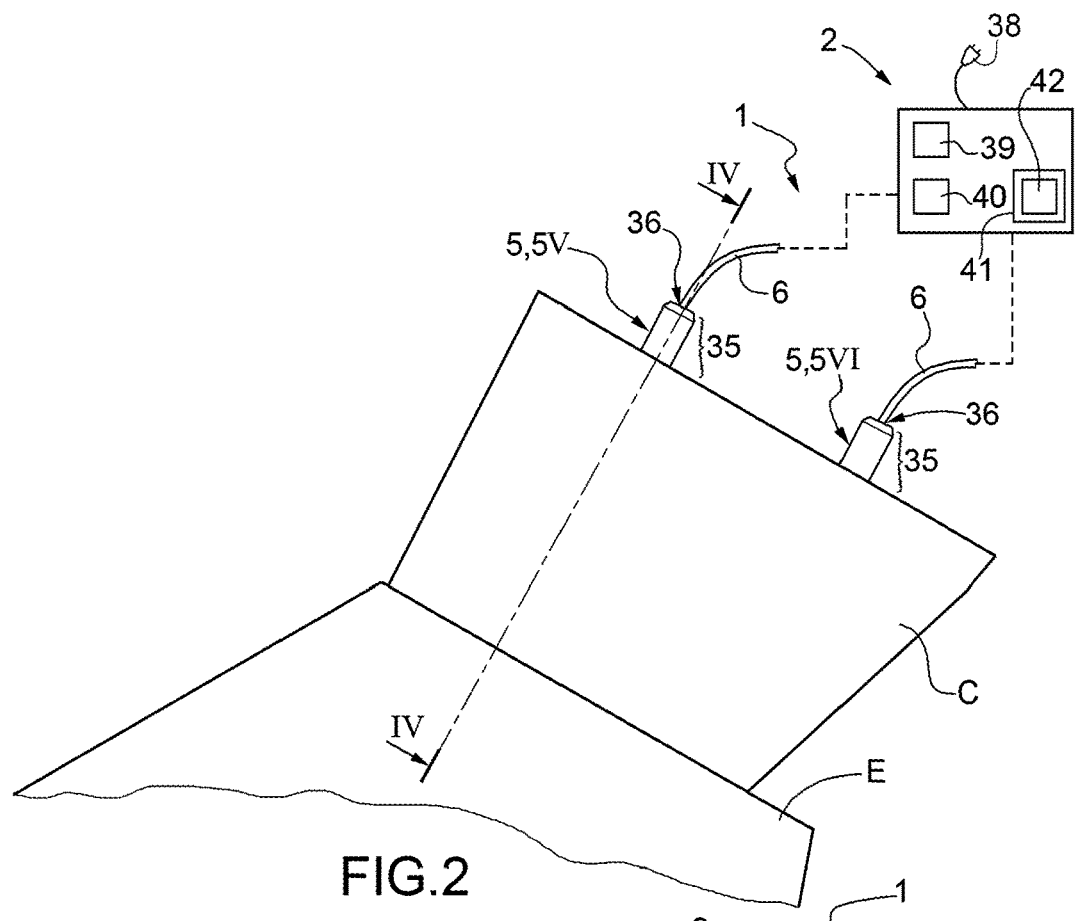
FIG. 2 schematically illustrates an example of the possible use of the acquiring kit according to this invention.
Figure 3:
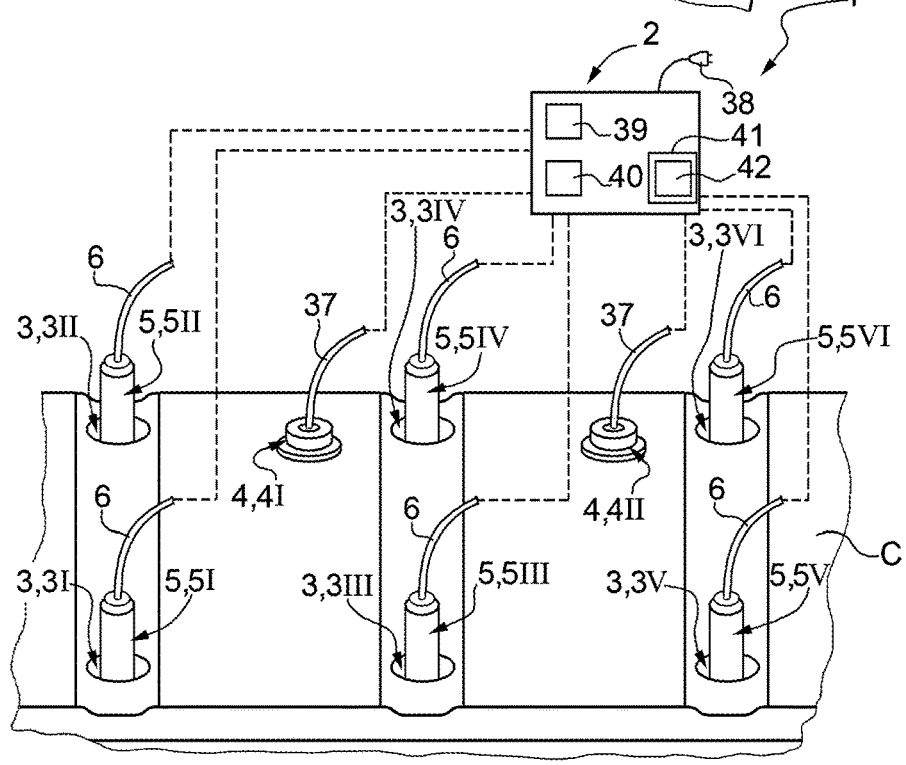
FIG. 3 is a view from above of FIG. 2.
Figure 4:
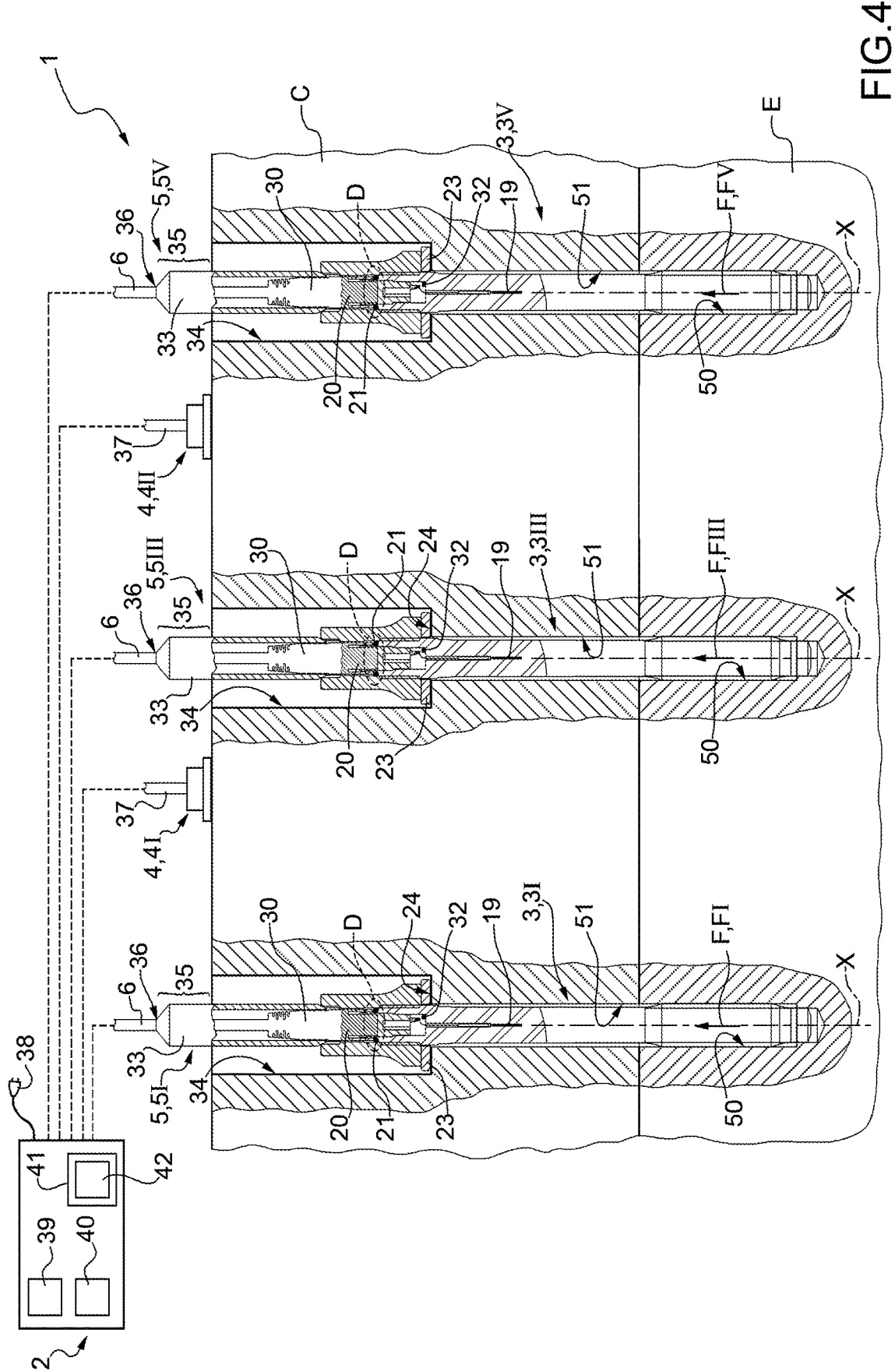
FIG. 4 is a partial, cross-section view along the line IV-IV in FIG. 3.

FIGS. 2 to 4 schematically illustrate, by way of non-exhaustive example, the application of fasteners, in particular studs 3 for tightening a cylinder head C to a crankcase E motor, as will be better illustrated below.

As illustrated in FIG. 1, the stud 3 provided with sensors has a longitudinal axis X and is axially symmetrical. The stud 3 is delimited longitudinally by two end portions, commonly known as the head 7 and tip 8, respectively.

The stud 3 has an outer surface divided into:
a threaded portion generally known as the root 9;
an additional threaded portion generally known as the shank 10;
a smooth portion, hereinafter referred to as the stem 11, which is located between and connects the root 9 with the shank 10.

In particular, the shank 10 is the portion made at the head 7, the root 9 is the threaded portion made at the tip 8.

The size combinations of the root 9—stem 11—shank 10 diameters can be different depending on the type of stud application. According to the example illustrated, the diameter of the stud 3 at the stem 11 is smaller than the diameter at the root 9 and the shank 10.

Advantageously, the stud 3 has a cavity 12 that is coaxial to the axis X. The cavity 12 is preferably axially symmetrical and is made inside the stud 3 in an area, generally known as the neutral axis, which is not subjected to buckling or twisting stress during use.

In FIGS. 1 to 9, the proportions of the dimensions of the cylindrical cavity 12 are only examples.

In particular, the cavity 12 is cylindrical and has a cross-section of a few mm in diameter. For example, for motor applications, i.e. for connecting a cylinder head C to a crank case E, the cavity 12 of the stud 3 has a diameter of 2 mm or less. Of course, the size of the diameter or cross-section of the cavity 12 is a function of the overall dimensions of the stud 3; therefore, it is obvious that, without losing any generality thereby, the diameter or cross-section of the cavity 12 may have different dimensions (larger or smaller) than those indicated.

The cavity 12 extends along the stud 3 so that there is an inner end 13 lying along the unthreaded stem 10, i.e. between the root 9 and the shank 10.

Figure 5:
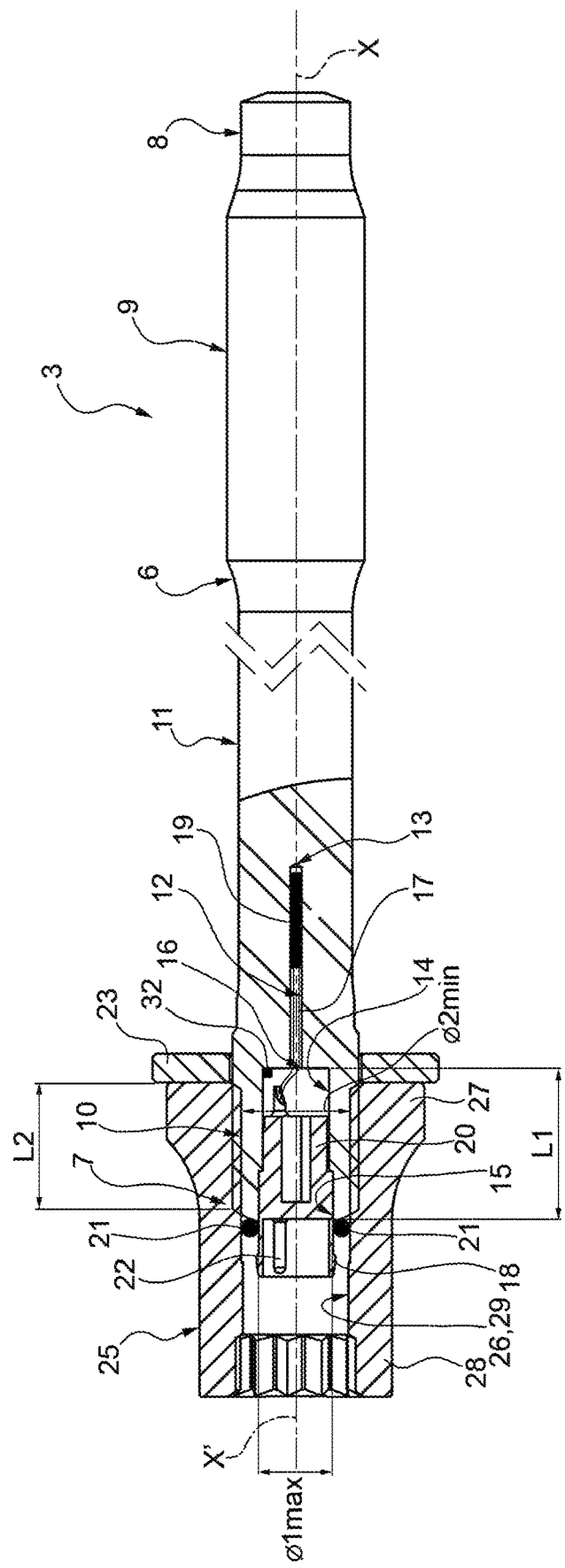
FIG. 5 is a partial, cross-section view, with parts removed for the sake of clarity, of a detail in FIG. 1.
Figure 10:
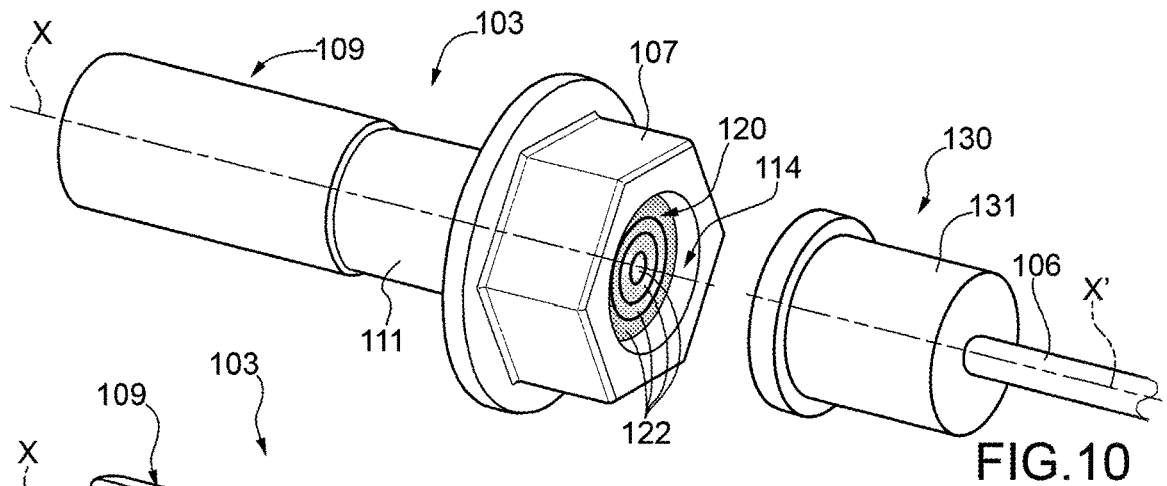
FIGS. 10 and 11 are a perspective view and, respectively, one in cross-section of a variation of the fastener and of the reader according to this invention in a first operating configuration.
Figure 11:
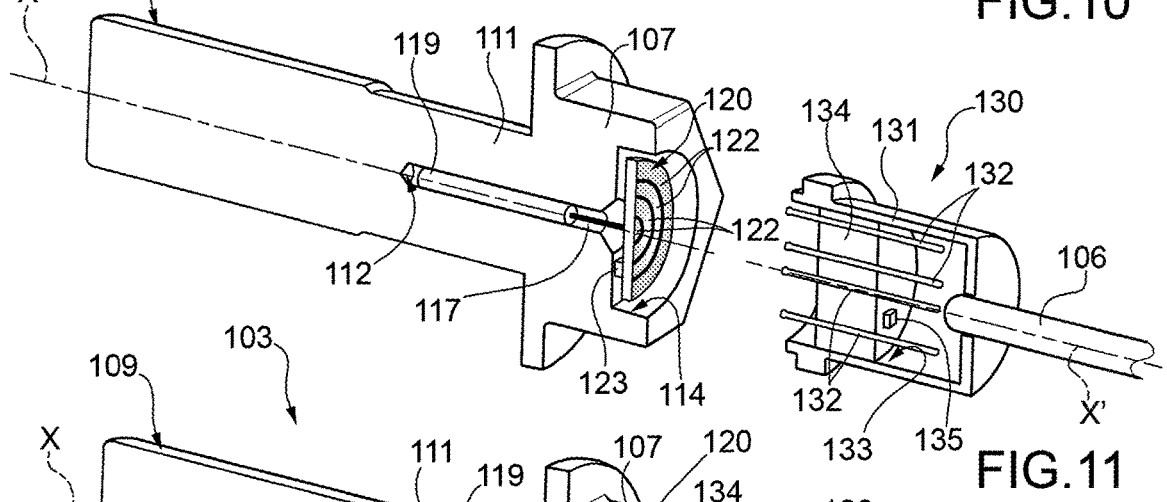
Figure 12:
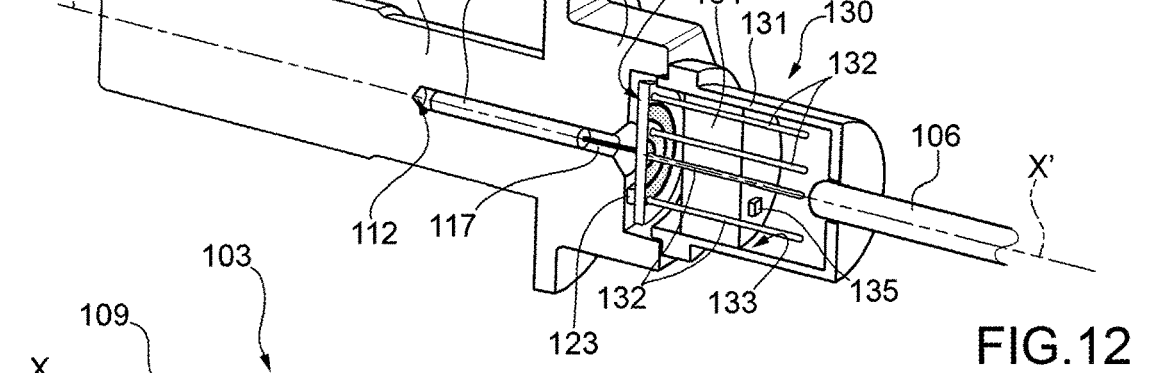
FIGS. 12 and 13 are similar to FIGS. 10 and 11 and illustrate a fastener and a reader according to this invention in a second operating configuration.
Figure 13:
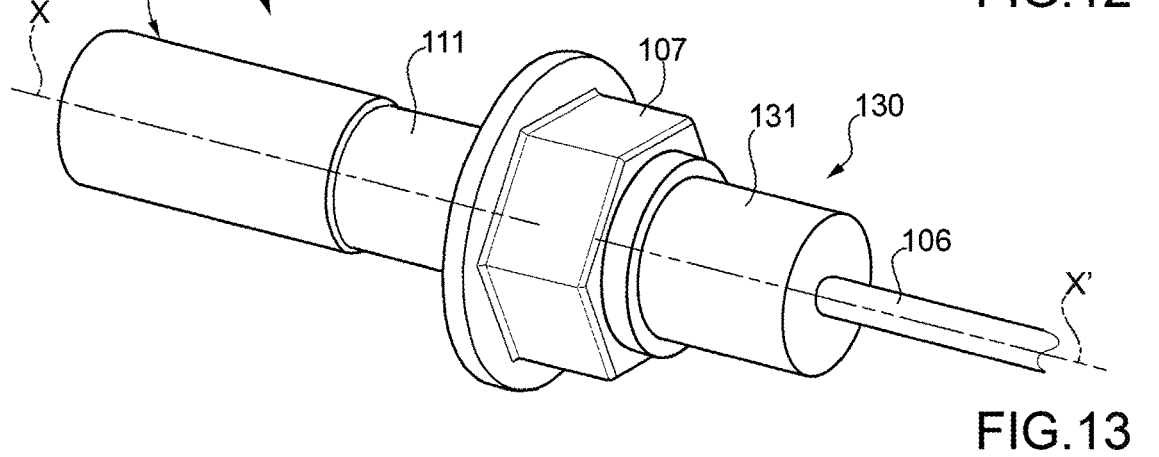

According to the example illustrated in FIG. 5, the stud 3 also has a housing 14 made inside the head 7. The housing 14 is coaxial to the axis X. The housing 14 is preferably axially symmetrical. The housing 14 faces the outside of the stud 3 through an opening 15 made in the head 7. The cavity 12 communicates with the housing 14 through a corresponding opening 16.

The housing 14 is made inside the stud 3 along the shank section thereof. The housing 14 is basically cylindrical and has a larger diameter than that of the cavity 12.

Advantageously, to ensure the correct static resistance of the stud 3, the following relationships exist $$\varnothing 1max = \varnothing 2min \times 0.41$$

$$L1 = L2 \times 0.53$$

Wherein:
ø1max is the maximum diameter of the housing 14;
ø2min is the smaller diameter of the threading (the thread groove bottom) of the shank 10;
L1 is the length along the longitudinal X axis of the housing 14;
L2 is the length along the longitudinal axis X of the screwing length of the shank 10.

The stud 3 also comprises sensing elements, i.e. sensor means to generate electrical signals according to the operating conditions of the stud 3. For example, as a sensing element, i.e. sensor means, the stud 3 comprises a strain gauge 19 inserted into the cavity 12. Advantageously, the strain gauge 19 is cylindrical in order to obtain a coupling with the shape of the cavity 12, promoting the stability of the stud 3 contact and maximising the contact surface area with the stud 3.

The strain gauge 19 is advantageously positioned inside the cavity 12 at a position with greater deformation/strain on the stud 3, e.g. at a cross-section with a smaller diameter. For a stud 3 intended for motor applications, i.e. for connecting a cylinder head C to a crankcase E, as in the example illustrated in FIG. 2, the strain gauge 19 is positioned between the root 9 and the shank 10. Without any loss of generality thereby, if the stud 3 has a different shape (i.e. different proportions between the shank 10, stem 11, and root 9 cross-sections), the strain gauge 19 can be positioned differently along the longitudinal axis X, preferably at a cross-section with a smaller diameter.

The stud 3 also comprises a connector 20 electrically connected to the sensing elements 19.

According to the example illustrated, the stud 3 comprises a connector 20 coaxial to the longitudinal axis X as the electrical interface. The connector 20 is inserted into the housing 14. The connector 20 is connected, interference fitted, with the housing 14.

The connector 20 preferably comprises a connection portion 18 that axially projects outside the housing. The connection portion 18 is cylindrical and coaxial to the longitudinal X axis. The connector 20 comprises conductors 17 that connect the connector 20 to the strain gauge 19. The connector 20, in particular, is capable of electrically connecting with the strain gauge 19. The connector 20 is of a known type and is schematically illustrated.

Advantageously, the connector 20 has electrical contacting areas 22 configured to be placed, in use, in contact with a reader 30, as will be better illustrated below.

According to the example illustrated in FIGS. 1 to 9, the electrical contacting areas 22 are pins. The pins 22 axially project outside the housing 14 and are configured to couple, in use, with the connection unit 5, as will be better explained below.

The stud 3 also comprises an O-Ring 21 (i.e. a sealing ring) that is fitted around the connection portion 18.

The stud 3 may comprise, other types of sensing elements, i.e. sensors, inserted inside the cavity 12 and/or the housing 14. For example, the stud 3 comprises, in addition, a temperature sensor 32. In this case, of course, the connector 20 comprises a number of conductors 17 and of electrical contacting areas 22 corresponding to the number and type of connections to be made with the sensors inserted in the stud 3.

The stud 3 also comprises a washer 23 of a known type that is schematically illustrated. The washer 23 is fitted around the shank 10 and is placed, in use, in contact with a shoulder surface of the cylinder head C.

The stud 3 also comprises a nut 25 with a longitudinal axis X' and a through-cavity 26. The nut 25 is configured to be fitted and screwed, in a known way, to the shank 10. The nut 25 also comprises a stop portion 27 that is pushed, in use, against the washer 23 and a cylindrical lateral shoulder wall 28. Advantageously, the lateral shoulder wall 28 has a longitudinal extension so as to project, once the nut 25 has been completely screwed, from the head 7 so as to delimit a housing chamber 29 for the connection unit 5 with the head 7 itself, as will be better described below.

The connection unit 5 comprises, in turn, a reader 30 that is configured to come into contact, in use, with the electrical contacting areas 22 of the electrical interface 20.

According to the example illustrated in FIGS. 2 to 9, the reader 30 is a female socket with housings 31, each of which is configured to accommodate, in a known way, the connection portion 18 and the pins 22 of the connector 20. The reader 30, i.e. the socket, can be connected, in a releasable way, with the connector 20.

The connector 20 may comprise, in addition, hooking elements (not illustrated) configured to adhere, in use, to the reader 30 so as to remain firmly connected to the reader 30, once the connector 20 and the reader 30 have been placed in contact/hooked. In this way, advantageously, the reader 30 can tear the connector 20 away from the stud 3.

The connection unit 5 also comprises a case 33 that externally covers at least a portion of the U 30 and the cable 6. The case 33 is cylindrical and is preferably made of a rigid or semi-rigid material.

The case 33 has a longitudinal extension such that it covers the portion of the reader 30 and of the cable 6 that, in use, would be exposed to external agents that could interfere with the measurement. In the example illustrated in FIGS. 2 to 4, the stud 3 is inserted into a groove 34 made in the cylinder head C and case 33 has an extension such that, in use, once brought into contact and interlocked with one end inside the chamber 29 of the nut 25, it projects with a terminal portion 35 outside the groove 34.

One end 36 of the socket 30 axially projects from the case 33 and is inserted, in use, inside the chamber 29 of the nut 25 and is coupled with the connector 20, so that each pin 22 is housed in a corresponding housing 31.

The nut 25 has, advantageously, a longitudinal extension such that it contains and shields the entire coupling area D between the connector 20 and the reader 30. In this way, the stability of the connection between the connector 20 and the reader 30 is ensured, under any operating conditions, even in environments that are particularly stressed by vibrations (just like the cylinder head C of an engine or the rotor of an aircraft may be). In addition, the chamber 29 of the nut 25 acts as a guide for correctly inserting the reader 30.

According to a variant not illustrated, e.g. for a different application, the stud 3 projects outside the nut, passing through it, and the coupling area between the connector and the socket is made outside the nut and/or the stud.

Advantageously, the O-ring 21 isolates, in use, the coupling area D between the connector 20 and the reader 30 to prevent grease or lubricant from seeping into this electrical coupling area D, interfering with the measurement, or even making it impossible.

According to one variant, not illustrated, the connector and the socket can rotate in relation to each other around the longitudinal axis X in use. In this way, it is possible to exchange data between the stud 3 and the acquiring system 2 even when screwing the stud 3 itself, thus avoiding the twisting of the cable 6. For example, the connector is either of the SLIP-RING type or of the coaxial type, for example the type generally known as COAXIAL JACK. Advantageously, as described above, the stud comprises retaining elements, such as seals or the like, placed between the stud and the nut in order to avoid oil and/or grease seeping into the coupling area between the connector and the socket.

The kit 1 may also comprise additional sensors connected to the acquiring system 2. Advantageously, the kit 1 comprises one or more screws 4 provided with sensors for detecting other information. For example, the kit 1 comprises a screw 4 provided with sensors of the type described in the patent WO-2016/193887 A1, to determine a heat flow, i.e. a difference in temperature between two areas A and B of the screw 4 provided with sensors. For example, a screw 4 provided with sensors can be used to attach the cover of an engine (known and not illustrated) to the cylinder head C at an area with significant heat flow.

According to the example illustrated, the screw 4 provided with sensors is connected to the acquiring system 2 via a cable 37.

The acquiring system 2 is configured to receive signals from each screw 4 provided with sensors and from each stud 3 during the screwing step, i.e. during the application of the screwing torque.

The acquiring system 2 is able to store and signal the deformation and, consequently, the axial force F to which each stud 3 is subjected.

According to the example illustrated in FIGS. 2 to 4, in the case of an application with a plurality of studs 3 (hereafter identified as 3I, 3II, 3III, 3IV, 3V, and 3VI), the studs 3 themselves can be positioned next to each other, as in the case of a motor where there is basically a matrix of studs 3. Of course, the matrix illustrated is only an example and the number and arrangement of studs 3 may vary depending on the specific application. In these types of applications, the axial force applied to one stud 3 can also influence the axial force applied to the other studs 3. Therefore, even if a stud 3 has been tightened at first in order to generate a precise axial force, adjustments may have to be made after tightening the other studs 3.

Advantageously, the acquiring system 2 is able to progressively store and signal the axial force F of each screwed stud 3. In this way, it is possible to define the best screwing strategy for the studs 3 in order to obtain the desired axial force F on each stud 3.

The acquiring system 2 comprises: a power supply system 38 of a known type (e.g. a plug for connecting to a mains power supply and/or a battery and/or other electronic device); a memory unit 39; a processing unit 40; and a data management unit 41 that is configured to exchange data outside the acquiring system 2, e.g. with a user.

The acquiring system 2 is advantageously integrated into a small mobile device that can be easily transported and placed on board a vehicle or near a mechanical apparatus.

Advantageously, the acquiring system 2 is a pre-existing mobile device, such as a smartphone or tablet, on which a dedicated application is installed.

The memory unit 39 is configured to associate and store the value of the axial force F detected for each fastener 3 for one or more tightening parameters. The tightening parameters include, for example: the tightening torque applied to the fastener; the temperature at which the fastening takes place; the value of the axial force F of the associated fasteners 3 already applied to a mechanical component, or the like.

The processing unit 40 is configured to process the data exchanged with the strain gauge 19 and the tightening parameters entered in input, manually or automatically, or exchanged with any other sensors, such as, for example, the sensor 32 and any screws 4 provided with sensors. The tightening parameters comprise, for example, the value of the tightening torque applied to a certain stud 3, or in the case of the application of a plurality of studs 3 the tightening torques and the axial forces of the other studs and, in the case of additional sensors, data relating to other operating conditions, such as, for example, the expected or actual operating temperature of the stud 3 or any heat flows in certain areas or the heat uniformity condition of the mechanical component that serves to ensure a correct measurement.

In particular, the processing unit 40 is able to automatically detect the value of the axial force F developed in each stud 3.

The processing unit 40 exchanges data with the memory unit 39 and the data management unit 41.

The data management unit 41 can be made in a number of different ways. As illustrated in FIG. 1, the data management unit 41 comprises a user interface 42, for example a display, to exchange data in input and in output with the same user.

According to a variation not illustrated, the user interface 42 is an application (generally known as an app) for mobile devices. Advantageously, the data management unit 41 is a mobile device. For example, the data management unit 41 is a smartphone, a tablet, and/or a computer.

The FIGS. 10 to 13 indicate: with 103 a variant of the fastener according to this invention; and with 130 a variant of the reader according to this invention.

The fastener 103 is a screw comprising a stem 111 that has a threaded root 109 and a head 107. The fastener 103 has a longitudinal axis X, a cavity 112, and a housing 114. The cavity 112 faces the outside of the screw 103 through the housing 114. The cavity 112 is coaxial to the longitudinal axis X. The housing 114 is mainly made inside the head 107.

The features of the screw 103 are similar to those of the stud 3 and are to be considered as included here, without repeating them, for the sake of brevity.

The screw 103 comprises, in addition, one or more sensing elements 119, i.e. sensors, arranged inside the cavity 112.

The screw 103 comprises an electrical interface 120, which comprises, in turn, an isolating support on which electrical contacting areas 122 are applied that are connected to the sensing elements 119.

Without any loss of generality thereby, according to the example illustrated in FIGS. 10 to 18, the electrical interface 120 of the sensing element is a printed circuit board.

The printed circuit board 120 (PCB) is advantageously a component used in electronic apparatuses that are simple and easy to manufacture.

The electrical interface/printed circuit board 120 can be, for example, a multi-layer structure. To electrically connect the conducting portions placed on the opposite sides of the electrical interface/printed circuit board 120, metallic holes called "vias", as known to persons skilled in the art, can, for example, be used.

According to a variant not illustrated, the electrical interface 120 can have an isolating support based on silicon or ceramic material or the like.

The electrical interface 120 is positioned inside the housing 114 and is electrically connected to each sensing element 119. For example, the electrical interface 120 is connected by means of conductors 117 to the sensing element 119.

As illustrated in FIGS. 10 to 18, the electrical interface/printed circuit board 120 has a basically circular shape. The electrical interface/printed circuit board 120 is coaxial to the longitudinal axis X. The electrical interface/printed circuit board 120 has a plurality of electrical contacting areas 122, each of which is configured to be placed in contact, in use, with the reader 130.

More specifically, the electrical contacting areas 122 are tracks, i.e. metallic elements, circular in shape, i.e. circular, concentric crowns that are coaxial to the longitudinal axis X of the screw 103.

Figure 15:
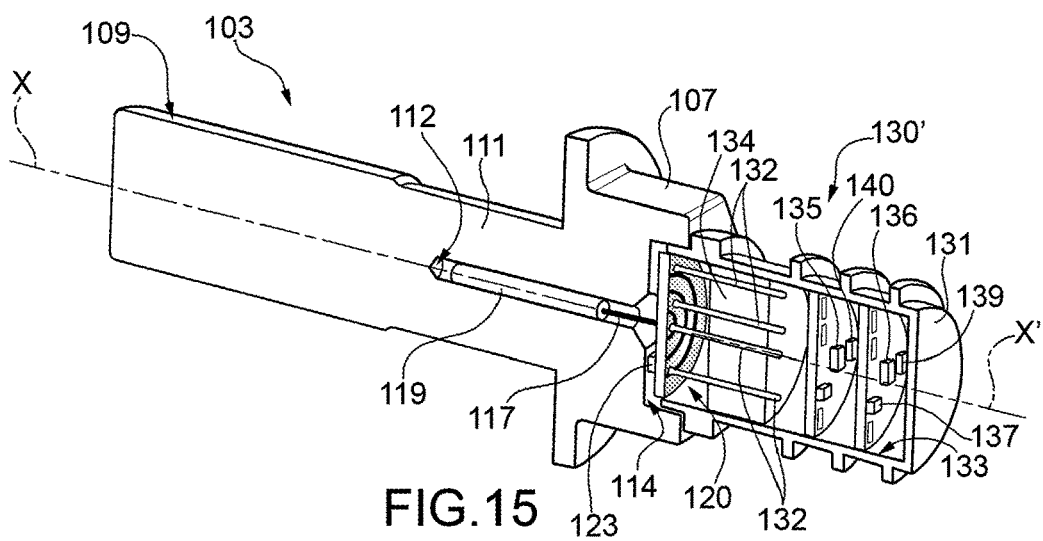
FIG. 15 is similar to FIG. 11 and illustrates an additional variant of a reader according to this invention in a second operating configuration.
Figure 16:
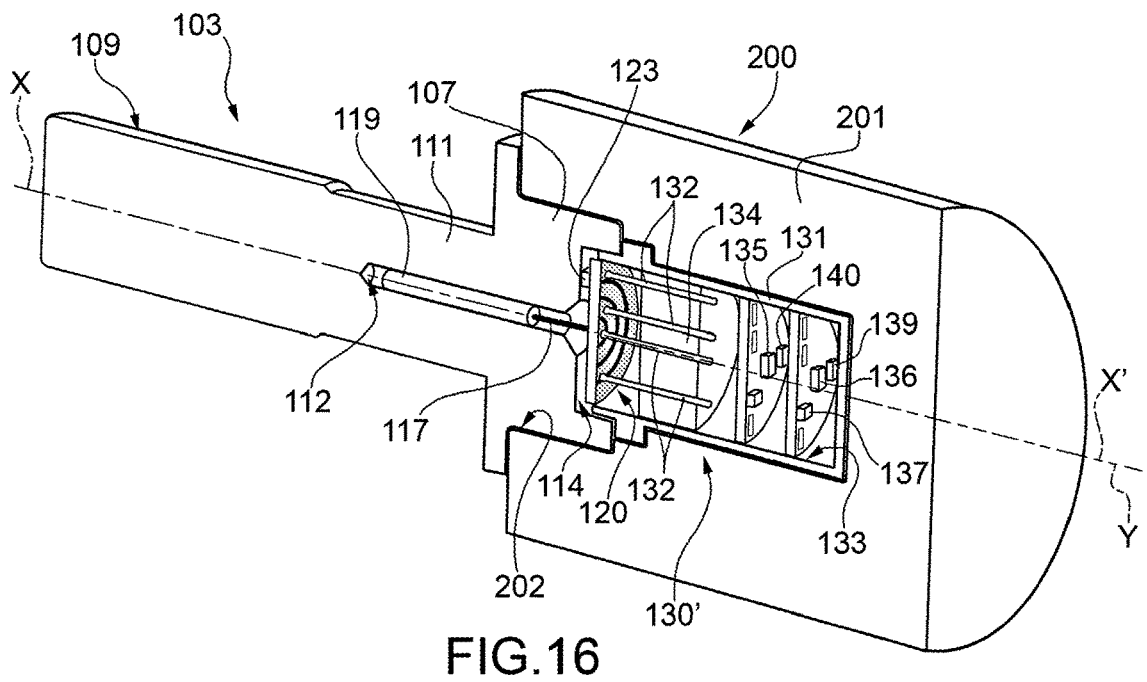
FIG. 16 illustrates a reader according to this invention in an additional operating configuration.
Figure 18:
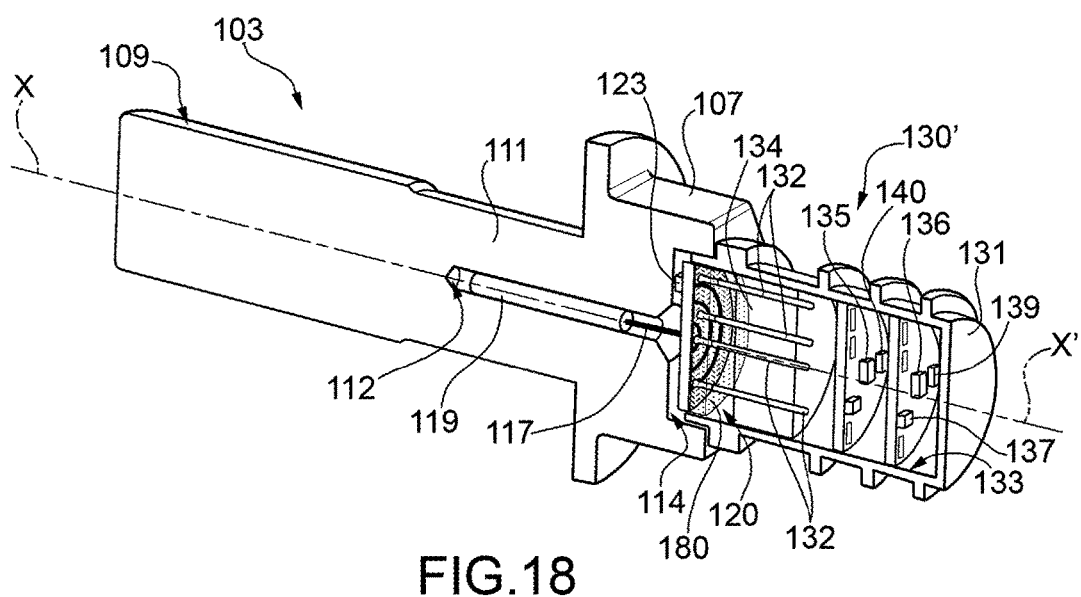
FIG. 18 is similar to FIG. 17 and illustrates the fastener according to this invention in an operating configuration.

Advantageously, the electrical interface/printed circuit board 120 comprises an electronic part 123 for pre-conditioning the signal and/or identifying the fastener itself placed on one or both faces of the electrical interface/printed circuit board 120 (without any loss of generality thereby, it is illustrated behind in FIGS. 15, 16, and 18, but could be in front, or on both faces of the electrical interface/printed circuit board 120). Each reference hereafter to "printed circuit board 120" should be understood as a reference to "electrical interface/printed circuit board 120". The electronic part 123 is positioned so as not to interfere with the electrical contacts 132. The electronic part 123 can be configured to reduce the number of electrical contacting areas 122 in relation to the number of conductors 117 connected to the sensing elements 119 and to use the electrical signals with a higher bandwidth than those that the sensing elements 119 provide.

The electrical interface/printed board 120 may comprise an RFID tag or a device conveniently programmed for identifying and tracing the corresponding screw 103.

The printed circuit board 120 may comprise, in addition, hooking elements (not illustrated) configured to adhere, in use, to the reader 130 so as to remain firmly connected to the reader 130, once the printed circuit board 120 and the reader 130 have been placed in contact/hooked. In this way, advantageously, the reader 130 is able to tear the printed circuit board 120 away from the screw 103, removing at least in part the electronic component (printed circuit board 120 and any sensors 119) applied to the screw 103. In this way, the printed circuit board 120 advantageously acts as a seal, i.e. as an element indicating the first use of the screw 103. In fact, the absence of the printed circuit board 120 from the screw 103 would be a signal that the screw 103 has already been used and has already been subjected to measurement and, possibly, to loads.

Advantageously, the fastener 103 may comprise a top (not illustrated) that is used to close the housing 114 once the measurements have been taken, so as to protect the printed circuit board 120 from external agents during the use of the fastener 103.

As illustrated in FIGS. 10 to 13, the reader 130 comprises a body 131 configured to be gripped manually or by means of a tool or to be integrated into a tightening tool 200 (FIG. 16).

According to what illustrated in FIGS. 10 to 13, the body 131 is a cup-shaped body with an inner cavity 133 with a circular cross-section. The body 131 has a longitudinal axis X'. The body 131 is configured so that it is positioned, in use, coaxially to the longitudinal axis X of the screw 103.

The reader 130 also comprises one or more electrical contacts 132, each of which is configured to be placed in contact, in use, with a respective contact area 122 of the electrical interface 120.

Advantageously, the electrical contacts 132 are cylindrical bodies with a small diameter, e.g. nails.

The electrical contacts 132 are preferably telescopic components generally known as SPRING PROBES or SPRING CONTACT TEST PROBES and usually used for testing printed circuit boards. Advantageously, this type of electrical contact 132 makes it possible to optimise contact with the test surface (in this case with a respective contact area 122).

As illustrated in FIGS. 10 to 16, the body 131 comprises a support 134, which is inserted into the cavity 133, and into which the electrical contacts 132 are inserted.

The electrical contacts 132 are basically parallel to the longitudinal axis X' of the body 131 of the reader 130.

Advantageously, the body 131 is configured to mechanically connect, in a stable manner, i.e. hook, to the fastener (to the screw 103, according to the images illustrated) during use. The body 131 may comprise hooking systems that couple by similar shapes and/or interference. For example, the body 131 may comprise a system using bayonets or interference with the interposition of a gasket or the like. In this way, advantageously, the reader 130 is firmly connected to the fastener 103 in use.

Advantageously, the reader 130 comprises an electronic part 135 connected to the electrical contacts 132 for signal conditioning and communication, as will be further explained below.

According to the variant illustrated in FIGS. 10 to 13, the reader 130 also comprises a cable 106 the conductors of which are connected to the electrical contacts 132 and/or to the electronic part 135. In use, the cable 106 is connected to the acquiring system 2.

Figure 14:
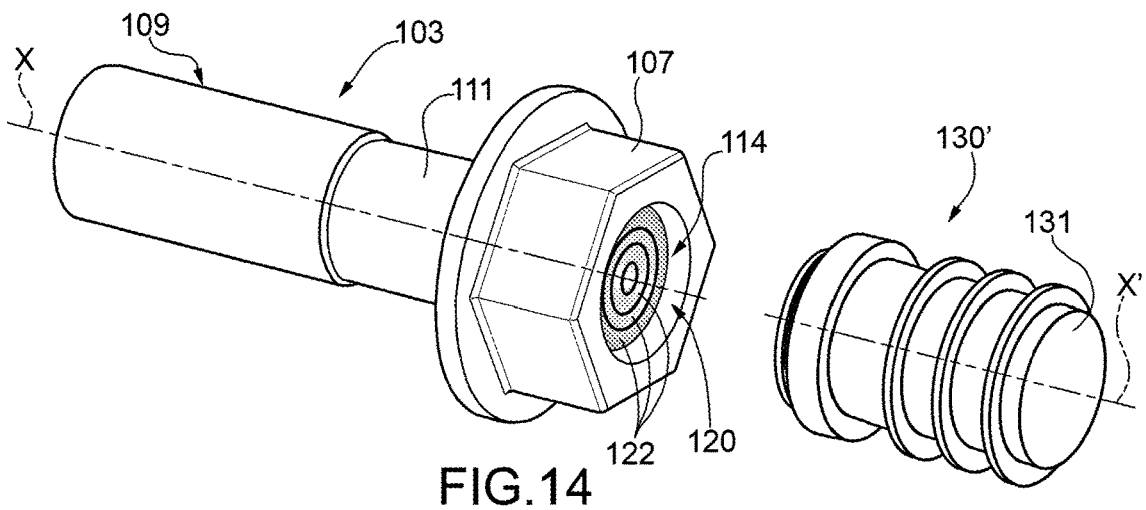
FIG. 14 is similar to FIG. 10 and illustrates an additional variant of a reader according to this invention in a first operating configuration.

FIGS. 14 to 16 illustrate, with reference number 130', a variant of the reader 130' configured to wirelessly connect the reader 130' to the acquiring system 2. Unlike the first reader 130, the second reader 130' does not have the cable 106. The features described and illustrated above for the first reader 130 are also valid for the second reader 130' and are not repeated, for brevity's sake.

Advantageously, the reader 130, 130' integrates one or more additional electronic parts of the user's choice from the following group of electronic parts:
- an electronic part for amplifying/conditioning 135 the signal;
- an electronic part 136 for storage.

The reader 130' also advantageously integrates:
- an electronic part 137 for wireless communication.

The electronic part 137 for wireless communication can be a communication system:
- near wireless (generally operating within a few millimetres), e.g. on the inductive or capacitive principle; and/or
- radio frequency (usually up to a few metres), for example a Bluetooth or wi-fi system; and/or
- optical, for example, an infrared system.

Without any loss of generality thereby, the communication system can be any wireless communication system generally known to a person skilled in the art.

Advantageously, the reader 130' also comprises an electric energy storage unit 139 and/or an energy recovery system 140, or an energy harvesting system.

Advantageously, as illustrated in FIG. 16, the reader 130' is configured to be integrated into a tightening tool 200, generally known as an impact sleeve, which is configured to be fitted, in use, around the head 107 of a screw 103.

FIG. 16 shows, with reference number 200, a tightening tool comprising a reader 130'. According to a variant not illustrated, the tightening tool may have an electrical connection cable to connect to the acquiring system 2 and comprise a reader 130 as illustrated in FIGS. 10 to 13.

For example, the tightening tool 200 can be an impact sleeve with a body 201 with a longitudinal axis Y and a cavity 202 that faces the outside of the tightening tool 200 at one end. As illustrated in FIG. 16, the cavity 202 is configured to obtain a coupling with the shape of the fastener 103. In the example illustrated, the cavity 202 is configured so that the tightening tool 200 can be fitted to the head 107 of the screw 103.

According to a variant not illustrated, the sleeve can be of the male type, instead of the female type (i.e. with the reader 130, 130' inserted inside the cavity 202); in this case, the reader 130, 130' projects outside the sleeve and is configured to be inserted into a respective housing of the fastener.

Figure 17:
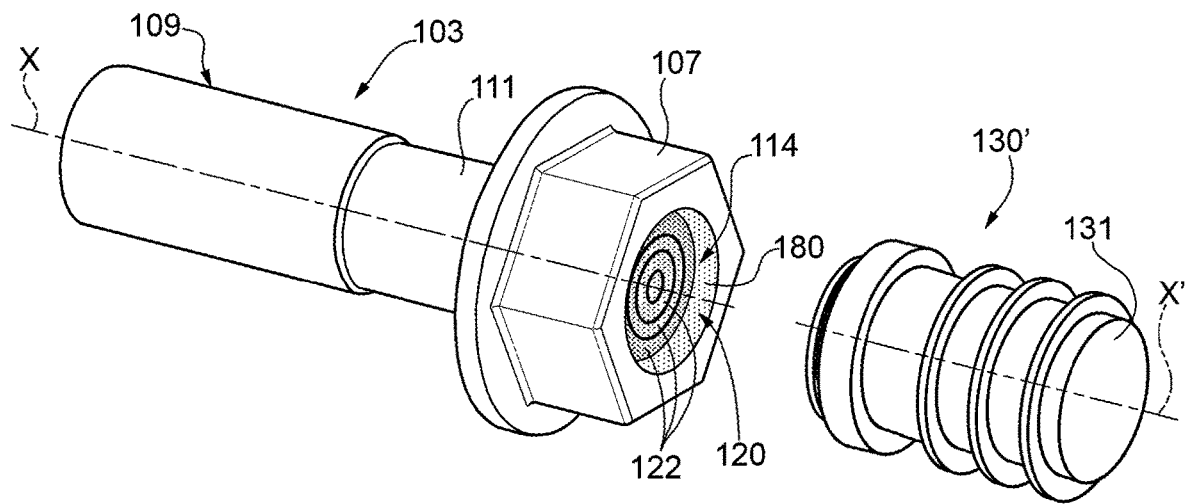
FIG. 17 is similar to FIG. 10 and illustrates a variant of the fastener according to this invention.

According to the variant illustrated in FIGS. 17 and 18, the fastener 103 also comprises a top 180 that is used to close the housing 114. In the figures, for greater clarity, the top 180 is schematically shown with a dotted background. The top 180 is configured to hermetically seal the housing 114. In particular, the top 180 seals the electrical interface 120 inside the housing 114. Without any loss of generality thereby, the electrical interface 120 can be of any type. According to the example illustrated in FIGS. 17 and 18, the electrical interface 120 is a printed circuit board with circular contact areas 122.

Advantageously, the top 180 serves as protection for the electrical interface 120.

The top 180 can be configured to be removed. Alternatively, the top 180 is attached to the fastener 103 so that it cannot be removed; in this case, the top 180 can be perforated.

As illustrated in FIG. 180, the top 180 is made of a material configured to be perforated, at least in part, by the reader 130, in particular by the electrical contacts 132.

According to one variant not illustrated, the top 180 is removable and is made of a non-perforable material.

Advantageously, the top 180 is made of a polymer material configured to self-close, i.e. to recover its initial shape (by closing the through holes of the electrical contacts 132) once the reader 130, 130' has been removed. For example, the top 180 is made of polymer material or rubbers known to persons skilled in the art, such as silicone.

In use, each stud 3 is tightened inside a corresponding seat. In particular, according to the example illustrated in FIGS. 2 to 4, the crankcase E has a plurality of blind holes 50 that are threaded. Each stud 3 is screwed, in a known way, with the respective root 9 to a corresponding blind hole 50. The cylinder head C is placed above the crankcase E in order to fit the holes 51 around the corresponding shanks 10.

Then, a washer 23 is fitted around each stud 3, and placed on a corresponding shoulder surface 24 of the cylinder head C.

Then, for each stud 3 a nut 25 screwed onto the shank 10 is tightened with a tightening torque against the washer 23.

The reader 30 is inserted inside the chamber 29 and connected to the connector 20, so as to enable the exchange of data between the strain gauge 19 and any other sensors 32 and the acquiring system 2. If other screws provided with sensors 4 are also included, each screw provided with sensors is mounted in a respective seat and connected to the acquiring system 2.

Then, the acquiring system 2 is activated and the axial forces F developed in each stud 3 are measured.

Advantageously, compared to known systems, in which the strain gauges are positioned outside the stud and the wires are squashed between the cylinder head and the crankcase and are subjected to vibrations and shocks, the kit 1 of the type described above is robust and does not display uncertainties or failures in measuring owed to interference from external elements.

Advantageously, the kit 1 of the type described above can be used on any type of pre-existing structure, without requiring additional processing for its insertion. For example, in the known systems, it is necessary to widen the holes to allow the insertion of the strain gauge and the passage of the wires.

Therefore, the kit 1 of the type described above can be applied to any existing mechanical apparatus.

Advantageously, the wiring operations are extremely simple, in that they are based on inserting the reader 30 inside the chamber 29.

Advantageously, the measurement detected by each strain gauge 19 is precise, in that it is detected directly only the neutral axis of the corresponding stud 3.

Advantageously, the fact of including a fastener 103, with a printed circuit board with circular contact areas 122, as electrical interface 120 and a reader 130, 130', comprising nail-shaped electrical contacts 132, ensures the electrical contact between the fastener 103 and the reader 130, 130', whatever their mutual orientation around the longitudinal axis X. This advantageously increases the ease with which the reader 130, 130' is used and the quality of the contact between the reader 130, 130' and the printed circuit board 122.

Advantageously, the fact that the fastener 3, 103 comprises only the sensing elements 19, 119 and the connector 20 or electrical interface, 120 makes it possible to reduce the costs of production, making the fastener 3, 103 lighter and simpler to produce.

Advantageously, the fact that the fastener 103 comprises a printed circuit board 120 as electrical interface makes it possible to significantly reduce the production costs, the weight, and the dimensions.

Advantageously, the fact that the signals are transmitted to the acquiring system 2 by means of the reader 130, 130' makes it possible to integrate a part or all of the electronic components, which may be necessary for the conditioning of the signals emitted by the sensors 19, 119, into the reader 130, 130'. This makes it possible to integrate the most expensive and bulky electronic components into the reader 130, 130', which can be used several times to read a plurality of tightening elements 103. In this way, cost can be reduced, including for the user, who can use a smaller number of readers 130, 130' to acquire signals from a considerably higher number of fasteners 103. In addition, advantageously, integrating the electronic components into the reader 130, 130' makes it possible to move components sensitive to higher temperatures to operating zones with lower temperatures (i.e. zones where the temperature is lower than the operating temperature of the fastener 103).

Advantageously, the fact that the reader 130, 130' hooks to the electrical interface 120 of the fastener 103 makes it possible to be able to tear, for example remove, the electrical interface 120 itself and, if necessary, also the sensing elements 119, once the signal acquisition is complete. This makes it possible, therefore, to be able to provide a user with an additional guarantee, which allows them to check whether a fastener 103 has already been used (thus, potentially, already subjected to loads) or not. It basically functions as a seal and confirmation of the first use of the fastener 103 or as a removal tool with parts that, during use of the fastener 103, would reach temperatures that are too high and, therefore, could deteriorate/detach, damaging the mechanical apparatus.

Advantageously, the fact that the fastener 103 comprises a top 180 makes it possible to protect the electrical interface 120 from the external environment. In addition, advantageously, in the case of a top 180 that can be pierced, in particular of polymer material, it makes it possible to place the reader 130, 130' and the electrical interface 120 in contact through the top 180 itself. In this way, it is possible to completely eliminate, including during use, the exposure of the electrical interface 120 to the outside. Finally, advantageously, the fact that the top 180 is made of special polymer material or perforable rubber, for example silicon, makes it possible to autonomously re-close holes made by means of the reader 130, 130' once it is removed. In this way, the protection of the electrical interface 120 is advantageously ensured, even after the reading is taken.

Advantageously, the inclusion of a top 180, in particular of polymer material, which is crossed at least in part by the reader 130, 130' in use, more specifically by electrical contacts 132 (in particular the nails), makes it possible to stabilise the position of the reader 130, 130' and maintain the correct positioning of the electrical contacts 132 on the tracks 122.

Advantageously, the reader 130, 130', being of especially small dimensions, can be used even when any mechanism on which the fastener 103 is installed is being used. This makes it possible to continuously acquire signals, even during the operation of a mechanism.

Advantageously, the fact that the electronic components are inserted inside the reader 130' makes it possible to be able to use even components with larger dimensions and greater power. In this way, it is possible to use the reader 130' to be able to transmit data to an acquiring system 2, even remotely, or at a distance of some metres.

Advantageously, the inclusion of a tightening tool 200 comprising a reader 130, 130' makes it possible to maintain connectivity with the sensors 119, even during tightening. In addition, the inclusion of the reader 130, 130' integrated in a tightening tool 200 makes it possible to simplify the signal acquisition operation.

In addition, an acquiring kit of the type described above makes it possible to adapt it to the acquisition of signals even in particularly complex application contexts.

For example, in order to verify the correct tightening of a plurality of screws 103, installed on a mechanical apparatus, it is possible to acquire data on the load of one screw 103 during tightening with the tightening tool 200; at the same time, it is possible to acquire data on the load variation on the other screws 103 already installed on the mechanical apparatus, by means of the readers 130 and 130'. This makes it possible to obtain, in real time, a mapping of all the loads applied to each screw 103 of a complex mechanical apparatus, such as an engine or a rotor of an aircraft, acquiring and recording in real time the load that is applied during any tightening of each screw 103 by means of a tightening tool 200 of the type described above. Therefore, an acquiring kit according to this invention makes it possible to simplify, speed up, and increase the reliability of tightening protocols for complex mechanical equipment, such as aircraft engines or rotors, or the like.

The invention claimed is:

1. A signal acquiring method comprising using a plurality of fasteners configured to fasten components of a mechanical apparatus to each other, a plurality of readers and an acquiring system; the method comprising the steps of:

setting up the plurality of fasteners, each of which fastener has a cavity made inside the fastener, wherein each fastener comprises additional sensing elements positioned inside said cavity and wherein each of said sensing elements generates electrical signals as a function of axial force, temperature, heat flow or vibrations of the respective plurality of fasteners, wherein each fastener comprises an electrical interface which is electrically connected to said sensing elements; and wherein said electrical interface has one or more electrical contacting areas;

setting up a plurality of readers, each of which readers comprises one or more electrical contacts, each electrical contact being in contact, in use, with a respective electrical contact area of a respective fastener;

setting up an acquiring system configured to receive signals from said plurality of readers;

generating one or more electrical signals by means of said sensing elements;

making each reader integral with a respective fastener, and placing each electrical contact of said reader in contact with a respective electrical contact area of the respective electrical interface, via a stable mechanical coupling;

generating electrical signals by means of said sensing elements as a function of the axial force, the temperature, the heat flow or the vibrations of the respective plurality of fasteners;

transferring each signal to the acquiring system by means of said readers;

acquiring signals from the plurality of readers by means of said acquiring system.

2. A method according to claim 1, and comprising the additional steps of:
hooking each electrical interface to the respective reader; and
completely or partly removing the electrical interface of one fastener by means of the respective reader.

3. A method according to claim 1, wherein the plurality of fasteners are screws.

4. A fastener configured to connect, in use, two or more components of a mechanical apparatus to each other; the fastener comprising a portion at least partially threaded and having a longitudinal axis; wherein the fastener has an inner cavity; wherein said fastener comprises sensing elements positioned inside said cavity and wherein each of said sensing elements generates electrical signals as a function of axial force, temperature, heat flow or vibrations of said fastener, and an electrical interface; wherein the sensing elements are electrically connected to the electrical interface; wherein the electrical interface has one or more electrical contacting areas; the electrical interface being configured to be placed in contact, in use, with a reader; the fastener being characterised in that the electrical contacting areas are tracks that include metallic elements that are isolated from each other and, circular, concentric crowns coaxial to the longitudinal axis.

5. A fastener according to claim 4, wherein said electrical interface is a printed circuit board.

6. A fastener according to claim 5, wherein said printed circuit board-comprises a first electronic portion for preconditioning signals and/or identifying the fastener itself.

7. A fastener according to claim 4, wherein said electrical interface is configured to be at least partially removed, in use, by said reader after having performed the mechanical coupling between said electrical contacting areas and respective electrical contacts of said reader.

8. A fastener according to claim 4, wherein the sensing elements comprise one or more sensors and said sensing elements comprise at least one of a strain gauge, a temperature sensor, a heat flow sensor and an accelerometer.

9. A fastener according to claim 4, wherein said electrical interface being placed within said cavity; said fastener comprising a top configured to close, at least partially, said cavity; and wherein said top is pierceable and self-sealing, in use, at least partially by a reader.

10. A fastener according to claim 9, wherein the top is made of self-sealing polymer material.

11. A reader for a fastener according to claim 4; the reader comprising a body and one or more electrical contacts, wherein the body is a cup-shaped body with an inner cavity with a circular cross-section; the body has a longitudinal axis; the body is positioned, in use, coaxially to the longitudinal axis of the fastener; the body comprises hooking systems that couple, in use, by similar shapes and/or interference with the fastener; the body comprises a support into which the electrical contacts are placed; electrical contacts are distributed in circular, concentric crowns coaxial to the longitudinal axis to be placed, in use, in contact with a respective electrical contact area of an electrical interface of said fastener; said reader further comprising, in turn, a plurality of telescopic nails forming nail-shaped electrical contacts; each electrical contact being configured to be placed, in use, in contact with a respective electrical contact area of said printed circuit board.

12. A reader according to claim 11, further comprising at least one of: an amplifying portion of the signal, an electric energy storage unit, and an energy recovery system.

13. A reader according to claim 12, wherein the energy recovery system is an energy harvesting system.

14. A reader according to claim 11, wherein the plurality of nail-shaped electrical contacts are telescopic nails.

15. A fastener according to claim 4, wherein the fastener is a screw.

16. A signal acquiring kit comprising one or more fasteners, one or more readers, and an acquiring system; wherein each fastener comprises a portion at least partially threaded and having a longitudinal axis; wherein the fastener has an inner cavity; wherein said fastener comprises additional sensing elements positioned inside the cavity; wherein each sensing element is configured to generate electrical signals as a function of axial force, temperature, heat flow or vibrations of the respective fastener; wherein each fastener comprises an electrical interface; wherein the sensing elements are electrically connected to the electrical interface; wherein each reader comprises one or more electrical contacts, each electrical contact being configured to be placed in contact, in use, with a respective electrical contact area of a respective fastener; wherein the acquiring system comprises a memory unit, a processing unit, and a data management unit that is configured to exchange data outside the acquiring system; wherein the memory unit is configured to associate and store the value of the axial force or temperature or heat flow or vibrations detected for each fastener by means of the signals generated by said sensing elements; and wherein the processing unit is programmed to process the signals exchanged with said sensing elements.

17. An acquiring kit according to claim 16, wherein the fastening parameters are given in input, manually or automatically, or are connected with one or more other sensors and one or more other screws provided with sensors; wherein the tightening parameters comprise: the value of the tightening torque applied to a determined screw, or in case of a plurality of studs the tightening torque and the axial force of each screw; the exercise temperature of one or more screws; and/or possible heat flows in determined areas.

18. An acquiring kit according to claim 16, wherein the data management unit comprises a user interface to exchange data in input and in output with a user; wherein the data management unit is a mobile device, a smartphone, a tablet, and/or a computer.

19. An acquiring kit according to claim 18, wherein the user interface is a display.

* * * * *